United States Patent
Gusev et al.

(10) Patent No.: US 10,339,561 B2
(45) Date of Patent: Jul. 2, 2019

(54) METHOD OF DETECTING A CHANGE IN USER INTERACTIVITY WITH A SERP

(71) Applicant: YANDEX EUROPE AG, Lucerne (CH)

(72) Inventors: Gleb Gennadevich Gusev, Moscow (RU); Kirill Valerevich Nikolaev, Tula (RU); Aleksey Valerevich Drutsa, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 441 days.

(21) Appl. No.: 15/206,572

(22) Filed: Jul. 11, 2016

(65) Prior Publication Data

US 2017/0017992 A1 Jan. 19, 2017

(30) Foreign Application Priority Data

Jul. 16, 2015 (RU) .................................. 2015128919

(51) Int. Cl.
*G06Q 30/00* (2012.01)
*G06Q 30/02* (2012.01)
*G06F 16/9535* (2019.01)

(52) U.S. Cl.
CPC ..... *G06Q 30/0246* (2013.01); *G06F 16/9535* (2019.01); *G06Q 30/0201* (2013.01); *G06Q 30/0256* (2013.01)

(58) Field of Classification Search
CPC .............. G06Q 30/02; G06Q 30/0256; G06Q 30/0246; G06Q 30/0263; G06F 16/951; G06F 16/9535; G06F 16/953
See application file for complete search history.

(56) References Cited

U.S. PATENT DOCUMENTS

| 7,593,928 B2 | 9/2009 | Canon et al. |
| 7,831,658 B2 | 11/2010 | Khopkar et al. |

(Continued)

OTHER PUBLICATIONS

Song et al, Evaluating and Predicting User Engagement Change with Degraded Search Relevance, World Wide Web Conference Committee (IW3C2), WWW 2013, May 13-17, 2013, Rio de Janeiro, Brazil.

(Continued)

*Primary Examiner* — William S Brockington, III
(74) *Attorney, Agent, or Firm* — BCF LLP

(57) ABSTRACT

A method and system is described including presenting a first SERP version to a first set of users and a second SERP version to a second set of users; assessing first and second measures of user interactions with the first and second version of the SERP respectively, the user interactions being of a pre-selected type; computing a first and a second distribution of the first and second measures of user interactions and analyzing the first and second distributions conjointly for determining a change in user interactivity. The analyzing can include determining a set of ratios; determining a lowest ratio indicative of a smallest relative change and a highest ratio being indicative of a largest relative change within the set of ratios; determining the magnitude of the change in user interactivity based on the lowest and highest ratios; and determining a significance of the magnitude of the change in user interactivity.

14 Claims, 6 Drawing Sheets

(56) References Cited

U.S. PATENT DOCUMENTS

| | | |
|---|---|---|
| 7,937,340 B2 | 5/2011 | Hurst-Hiller et al. |
| 7,975,000 B2 | 7/2011 | Dixon et al. |
| 8,024,336 B2 | 9/2011 | Wai |
| 8,117,197 B1 | 2/2012 | Cramer |
| 8,898,153 B1 | 11/2014 | Kim et al. |
| 8,930,339 B2 | 1/2015 | Song et al. |
| 2005/0154716 A1* | 7/2005 | Watson ............. G06F 17/30648 |
| 2007/0208730 A1 | 9/2007 | Agichtein et al. |
| 2009/0089652 A1 | 4/2009 | Chi et al. |
| 2009/0125482 A1* | 5/2009 | Peregrine .......... G06F 17/30864 |
| 2011/0078131 A1* | 3/2011 | Wen .................. G06F 17/30864 |
| | | 707/711 |
| 2013/0246383 A1 | 9/2013 | White et al. |
| 2014/0180799 A1 | 6/2014 | Keeler et al. |
| 2014/0181066 A1 | 6/2014 | Giorcelli et al. |
| 2014/0365453 A1 | 12/2014 | Alonso Lago |
| 2015/0012852 A1 | 1/2015 | Borodin et al. |

OTHER PUBLICATIONS

Russian search report from RU patent application No. 2015128919 dated Oct. 5, 2016.

\* cited by examiner

| USERS FROM THE SECOND SET OF USERS | # OF SESSIONS |
|---|---|
| USER F | 4 |
| USER G | 3 |
| USER H | 4 |
| USER I | 1 |
| USER J | 6 |
| ... | ... |

SECOND MEASURES OF THE # OF SESSIONS WITH THE SECOND VERSION OF THE SERP — 206

202

| USERS FROM THE FIRST SET OF USERS | # OF SESSIONS |
|---|---|
| USER A | 1 |
| USER B | 3 |
| USER C | 4 |
| USER D | 3 |
| USER E | 2 |
| ... | ... |

FIRST MEASURES OF THE # OF SESSIONS WITH THE FIRST VERSION OF THE SERP — 204

METHOD OF DETECTING A CHANGE IN USER INTERACTIVITY WITH A SERP

CROSS-REFERENCE

The present application claims priority to Russian Patent Application No. 2015128919, filed Jul. 16, 2015, entitled "METHOD OF DETECTING A CHANGE IN USER INTERACTIVITY WITH A SERP", the entirety of which is incorporated herein by reference.

FIELD

The present technology relates to methods of and systems for detecting a change in user interactivity between a first and a second version of a SERP.

BACKGROUND

In recent years, A/B testing has become the state-of-the-art technique for improving web services based on data-driven decisions. They are utilized by many web and search engine companies, including search engines such as Bing and Google, social networks such as Facebook, etc. The largest web services have designed special experimental platforms that allow them to run A/B tests at large scale. An A/B test compares two variants of a service at a time, usually its current version (control) and a new one (treatment), by exposing them to two groups of users.

The aim of controlled experiments is to detect the causal effect of the system updates on its performance relying on a criterion that correlates with the quality of the system. A challenging problem is to choose an appropriate criterion applicable in practice, since it has to meet two crucial requirements, which often conflict.

First, the criterion should provide a quantitative value that allows making conclusions about the change in the system's quality, particularly, about the sign and magnitude of that change. In other words, the value of the criterion must have a clear interpretation. It is known in the art that many criteria may result in contradictory interpretations and their use in practice may be misleading and, therefore, the right choice of an appropriate criterion is a difficult task.

Second, when a treatment effect exists (e.g., effect of modifications on the user behavior), the criterion has to detect the difference of the two versions of the system at a high level of statistical significance in order to distinguish the treatment effect from the noise observed when the effect does not exist. This property is referred to as the sensitivity of the metric. The common problem is the low metric sensitivity in the cases when only a subtle modification is being tested or if only a small amount of user traffic is affected by the system change.

The state-of-the-art criteria for evaluating the performance of the two versions are generally based on mean values of the user behavior metrics. However, a fundamental disadvantage of these criteria is that the mean values of the user behavior metrics may not necessarily change, even if their distributions change significantly.

In the case of a search engine, there is a variety of different components, and their modifications may affect the distribution of a user behavior metric differently. The most important components of a Search Engine Results Page (SERP) are those which normally present data from several sources: organic search results, advertising results, vertical results, and others. If an update affects only the advertising results, then it is difficult to assess the total quality of the whole SERP, because advertising makes less than 10% in the search engine traffic. Therefore, the problem of low sensitivity of the appropriate criterion becomes particularly acute in this case.

SUMMARY

It is an object of the present technology to ameliorate at least some of the inconveniences present in the prior art.

According to one aspect of the present technology, there is provided a method of detecting if a change in user interactivity has occurred between a first and a second version of a SERP, the second version of the SERP being a modified version of the SERP, the method being executable at a server. The method comprises: presenting the first version of the SERP to a first set of users and the second version of the SERP to a second set of users; assessing first measures and second measures of user interactions with the first and the second version of the SERP respectively, the user interactions being of a pre-selected type of user interactions, computing a first and a second distribution of the first measures and the second measures of user interactions respectively, analyzing the first and the second distribution conjointly for determining a magnitude of the change in user interactivity. The analyzing comprises: determining a set of ratios, each ratio within the set of ratios being the ratio between a value of the first distribution and a corresponding value of the second distribution for each measure of user interaction respectively, determining a lowest ratio and a highest ratio within the set of ratios, the lowest ratio being indicative of a smallest relative change between the first and the second distributions and the highest ratio being indicative of a largest relative change between the first and the second distributions, determining the magnitude of the change in user interactivity based on a combination of the lowest ratio and the highest ratio, and determining a statistical significance of the magnitude of the change in user interactivity. The method also comprises, responsive to the magnitude of the change in user interactivity being statistically significant, determining that the change in user interactivity has occurred between the first and the second version of the SERP.

In some implementations of the method, the analyzing further comprises: computing a pair of distributions at least partially based on the highest and the lowest ratios, the computing comprises decomposing the first and the second distribution into a first and a second weighted sum of the pair of distributions respectively, and determining whether the detected change in user interactivity is positive or negative based on the pair of distributions.

In some implementations of the method, computing the first and the second distributions comprises discretizing the first measures and the second measures of user interactions into bins of measures of user interactions, the analyzing comprises each ratio within the set of ratios being the ratio between the value of the first distribution and the corresponding value of the second distribution for each bin of measures of user interactions, respectively.

In some implementations of the method, the combination of the lowest ratio and the highest ratio is calculated using:

$$\alpha^0 = \frac{(M-1)(1-m)}{M-m}.$$

In some implementations of the method, determining the statistical significance of the magnitude of the change in user interactivity comprises applying at least one of a Kolmogorov-Smirnov test and a combination of the bootstrapping technique with the one sample t-test.

In some implementations of the method, determining whether the detected change in user interactivity is positive or negative based on the pair of distributions comprises comparing respective mean values of each distribution within the pair of distributions with reference to the pre-selected type of user interactions.

In some implementations of the method, bins of the first measures of user interactions have identical intervals as bins of the second measures of user interactions.

According to one aspect of the present technology, there is provided a server comprising a processor and computer-readable instructions for detecting if a change in user interactivity has occurred between a first and a second version of a SERP, the second version of the SERP being a modified version of the SERP. The processor is configured to: present the first version of the SERP to a first set of users and the second version of the SERP to a second set of users, assess first measures and second measures of user interactions with the first and the second version of the SERP respectively, the user interactions being of a pre-selected type of user interactions, compute a first and a second distribution of the first measures and the second measures of user interactions respectively, analyze the first and the second distribution conjointly for determining a magnitude of the change in user interactivity. To analyze comprises: determining a set of ratios, each ratio within the set of ratios being the ratio between a value of the first distribution and a corresponding value of the second distribution for each measure of user interaction respectively, determining a lowest ratio and a highest ratio within the set of ratios, the lowest ratio being indicative of a smallest relative change between the first and the second distributions and the highest ratio being indicative of a largest relative change between the first and the second distributions, determining the magnitude of the change in user interactivity based on a combination of the lowest ratio and the highest ratio, and determining a statistical significance of the magnitude of the change in user interactivity. The server is also configured to, responsive to the magnitude of the change in user interactivity being statistically significant, determine that the change in user interactivity has occurred between the first and the second version of the SERP.

In some implementations of the server, to analyze further comprises computing a pair of distributions at least partially based on the highest and the lowest ratios, the computing the pair of distributions at least partially based on the highest and the lowest ratios comprises decomposing the first and the second distribution into a first and a second weighted sum of the pair of distributions respectively, and determining whether the detected change in user interactivity is positive or negative based on the pair of distributions.

In some implementations of the server, to compute the first and the second distributions comprises discretizing the first measures and the second measures of user interactions into bins of measures of user interactions, to analyze comprises each ratio within the set of ratios being the ratio between the value of the first distribution and the corresponding value of the second distribution for each bin of measures of user interactions, respectively.

In some implementations of the server, the combination of the lowest ratio and the highest ratio is calculated using:

$$\alpha^0 = \frac{(M-1)(1-m)}{M-m}.$$

In some implementations of the server, determining the statistical significance of the magnitude of the change in user interactivity comprises applying at least one of a Kolmogorov-Smirnov test and a combination of the bootstrapping technique with the one sample t-test.

In some implementations of the server, determining whether the detected change in user interactivity is positive or negative based on the pair of distributions comprises comparing respective mean values of each distribution within the pair of distributions with reference to the pre-selected type of user interactions.

In some implementations of the server, bins of the first measures of user interactions have identical intervals as bins of the second measures of user interactions.

In the context of the present specification, unless expressly provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless expressly provided otherwise, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless expressly provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the expression "component" is meant to include software (appropriate to a particular hardware context) that is both necessary and sufficient to achieve the specific function(s) being referenced.

In the context of the present specification, unless expressly provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, the expression "interactive" is meant to indicate that something is responsive to a user's input or that at least portions thereof are responsive to a user's input.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication. Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 illustrates assessed first and second measures of user interactions having been processed by a server and saved at a storage;

DESCRIPTION

Figure 1:
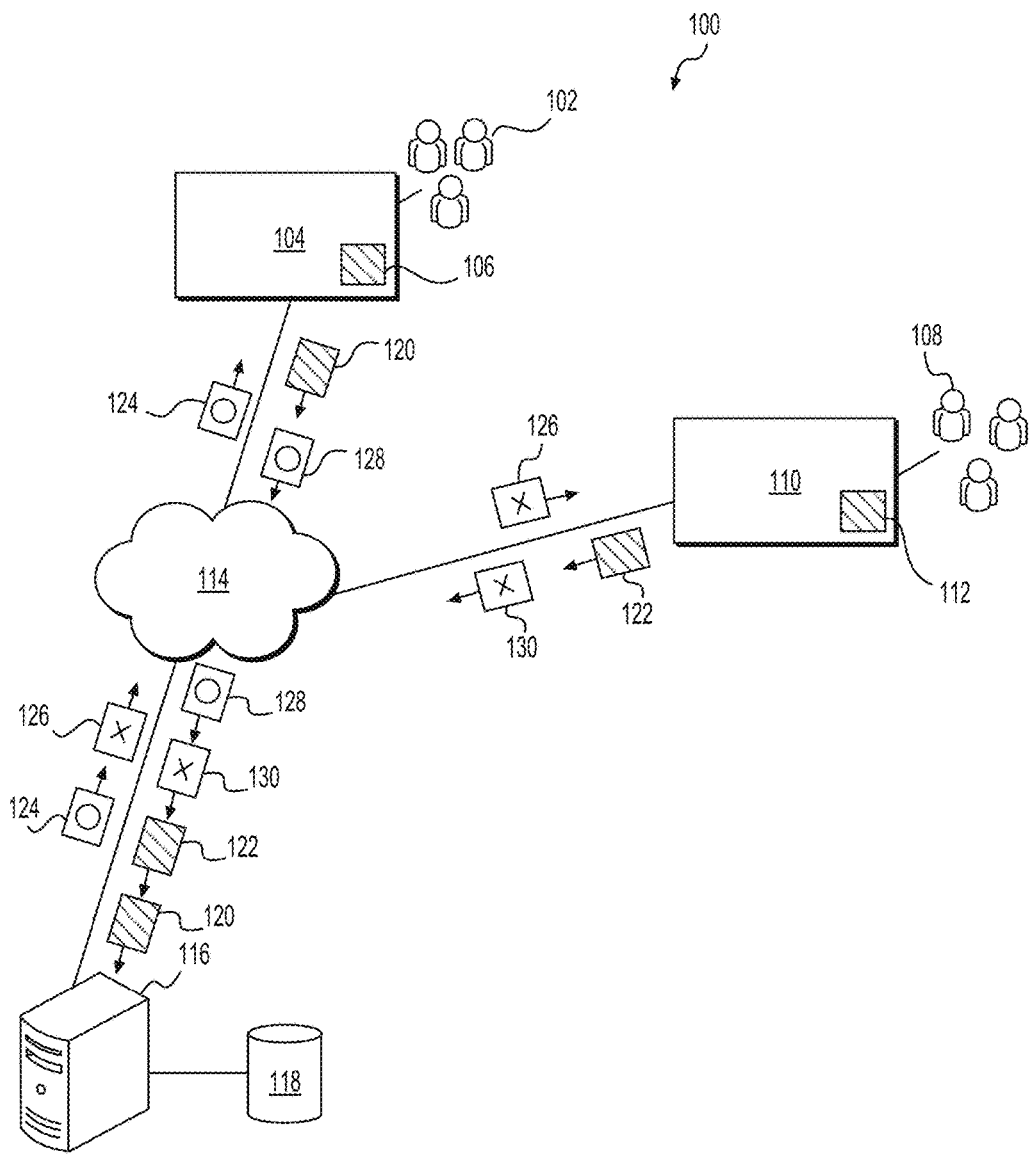
FIG. 1 is a schematic diagram of a networking system being an implementation of the present technology.

In FIG. 1 there is depicted a schematic diagram of a networking system 100 which is linked via a communication network 114. It is to be expressly understood that the networking system 100 is depicted as an illustrative implementation of the present technology. Thus, the following description should be considered only as the description of illustrative implementation of the present technology. This description is not intended to define the scope or set forth the bounds of the present technology. In some cases, what are believed to be helpful examples of modifications to the networking system 100 may also be described below. This is done merely as an aid to understanding, and, again, not to define the scope or set forth the bounds of the present technology. These modifications are not an exhaustive list, and, as a person skilled in the art would understand, other modification are likely possible. Further, where no examples of modifications have been set forth, it should not be interpreted that no modifications are possible and/or that what is described is the sole manner of implementing that, element of the present technology. As a person skilled in the art would understand, this is likely not the case. In addition it is to be understood that the networking system 100 may provide in certain instances simple implementations of the present technology, and that where such is the case they have been presented in this manner as an aid to understanding. As persons skilled in the art would understand, various implementations of the present technology may be of a greater complexity.

How a communication link (not depicted) is implemented is not particularly limited and will depend on which devices are connected to the communication network 114. As a non-limiting example, the connection of a server 116 to the communication network 114 can be implemented via a wired connection (such as an Ethernet based connection). At the same time, other devices could be also connected in other ways. In those examples, where a connected device (not depicted) is implemented as a wireless communication device (e.g. a smart-phone), the connection can be implemented as a wireless communication network (such as but not limited to, a 3G communications network link, a 4G communications network link, a Wireless Fidelity, or WiFi® for short, Bluetooth® and the like). In those examples, where a first electronic device 104 and a second electronic device 110 are implemented as desktop computers, the communication link can be either wireless or wired (such as an Ethernet based connection).

The networking system 100 may comprise the server 116. The server 116 may be implemented as a conventional computer server. In an example of an embodiment of the present technology, the server 116 may be implemented as a Dell™ PowerEdge™ Server running the Microsoft™ Windows Server™ operating system. Needless to say, the server 116 may be implemented in any other suitable hardware and/or software and/or firmware or a combination thereof. In the depicted non-limiting embodiment of present technology, the server 116 is a single server. In alternative non-limiting embodiments of the present technology, the functionality of the server 116 may be distributed and may be implemented via multiple servers. In some embodiments, the server 116 may comprise search engine software (not depicted) and may be further under control of a search engine provider such as Yandex™.

The server 116 includes a storage 118 that may be used by the server 116. Generally, the storage 118 may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof.

The implementations of the server 116 are well known in the art. So, suffice it to state, that the server 116 comprises inter alia a network communication interface (such as a modem, a network card and the like) (not depicted) for two-way communication over the communication network 114; and a processor (not depicted) coupled to the network communication interface, the processor being configured to execute various routines, including those described herein below. To that end the processor may store or have access to computer readable instructions stored in the storage 118, which instructions, when executed, cause the processor to execute the various routines described herein. The storage 118 of the server 116 is configured to store data including computer-readable instructions and databases.

In some implementations, the storage 118 is configured to store various data such as indexes of web pages that were crawled by a crawler application (not depicted) of the search engine software available on the server 116. In other embodiments, the storage 118 may store other data received by the server 110.

The networking system 100 comprises a first electronic device 104 and a second electronic device 110. The first electronic device 104 is associated with a first set of users 102 and the second device 110 is associated with a second set of users 108. It should be noted that the fact that the first electronic device 104 is associated with the first set of users 102 and the second electronic device 110 is associated with the second set of users 108 does not need to suggest or imply any mode of operation—such as a need to log in, a need to be registered or the like. In some embodiments, the first electronic device 104 and the second electronic device 110 may be implemented as the same electronic device. In other embodiments, the first set of users 102 and the second set of users 108 may comprise at least one mutual user. In other words, the first electronic device 104 and the second electronic device 110 and the first set of users 102 and the second set of users 108 have been illustrated in FIG. 1 as being distinct for ease of explanation only. In further embodiments, the first electronic device 104 may be a first plurality of electronic devices and the second electronic device 110 may be a second plurality of electronic devices. Again, the first and the second electronic devices 104 and 110 have been depicted as single electronic devices in FIG. 1 for simplicity only.

In some embodiments, a size of the first set of users 102 and a size of the second set of users 108 may be identical. In other words, a number of users in the first set of users 102 may be identical to a number of users in the second set of users 108. In alternative embodiments, the size of the first set of users 102 and the size of the second set of user 108 may be comparable. In other words, the number of users in the first set of users 102 may be close to the number of users in the second set of users 108. For example, the number of users in the first set of users 102 and the number of users in the second set of users 108 may be hundreds of thousands. However, it should be noted that the number of user in the first set of users 102 and the second set of users 108 is not intended to be a limiting aspect of the present technology.

The first electronic device 104 and the second electronic device 110 each include an information storage (not depicted). Generally, the information storage may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof. The information storage may store user files and program instructions. In particular, the information storage may store software for executing a browser application. In some embodiments, the first electronic device 104 may execute a browser 106 and the second electronic device 110 may execute a browser 112. Generally speaking, the purpose of the browser 106 and the browser 112 is to enable the first set of users 102 and the second set of users 108 to request web page data and displaying it thereto. In some embodiments of the present technology, the browser 106 and the browser 112 can be provided by the same vendor, yet in other embodiments, the browser 106 and the browser 112 may be provided by different vendors.

The implementation of the first electronic device 104 and the second electronic device 110 is not particularly limited, but as an example, the first electronic device 104 and the second electronic device 110 may be implemented as personal computers (desktops, laptops, netbooks, etc.), as wireless communication devices (a cell phone, a smartphone, a tablet and the like). In FIG. 1, the first electronic device 104 and the second electronic device 110 are implemented as laptops, such as for example, Apple™ MacBook Pro™ laptops. The first electronic device 104 may be executing the browser 106 being a Yandex™ browser application. The second electronic device 110 may be executing the browser 112 being another browser application. In some embodiments, the browser 106 and the browser 112 may be an identical browser application. It should be expressly understood that any other commercially available or proprietary browser application can be used for implementing non-limiting embodiments of the present technology. Moreover, it should be noted that the browser 106 as well as the browser 112 and the search engine available at the server 116 may have a common or a distinct provider.

Each user within the first set of users 102 may access a search engine provider's web site, such as www.yandex.com for example, via the browser 106 for viewing a set of search results associated with her user query. In other words, a data packet 120 may be generated by the browser 106 and may be sent to the server 116 via the communication network 114. The data packet 120 comprises a user request for a Search Engine Results Page (SERP). In some embodiments of the present technology, the search engine software of the server 116 may determine the set of search results and may generate and send a data packet 124 to the first electronic device 104. The data packet 124 may comprise a first version of the SERP and instructions for the browser 106 to display the first version of the SERP on the display of the first electronic device 104. How the SERP is generated is not particularly limited and can be generated using any known techniques.

In some embodiments, the data packet 120 may comprise a first plurality of data packets, each data packet of the first plurality of data packets being sent from a respective electronic device of the first plurality of electronic devices. Similarly, the data packet 124 may comprise a second plurality of data packets, each data packet of the second plurality of data packets being sent to the respective electronic device of the first plurality of electronic devices.

Similarly, each user within the second set of users 108 may access the search engine provider's web site via the browser 112 for viewing the set of search results associated with her user query. In other words, a data packet 122 may be generated by the browser 108 and may be sent to the server 116 via the communication network 114. The data packet 122 comprises the user request for the SERP. In some embodiments of the present technology, the search engine software of the server 116 may determine the set of search results and may generate and send a data packet 126 to the second electronic device 110. The data packet 126 may comprise a second version of the SERP and instructions for the browser 112 to display the second version of the SERP on the display of the second electronic device 110.

In some embodiments, the data packet 122 may comprise a third plurality of data packets, each data packet of the third plurality of data packets being sent from a respective electronic device of the second plurality of electronic devices. Similarly, the data packet 126 may comprise a fourth plurality of data packets, each data packet of the fourth plurality of data packets being sent to the respective electronic device of the second plurality of electronic devices.

The second version of the SERP is different from the first version of the SERP. In some embodiments, the second version of the SERP may be a modified version of the SERP. In other embodiments, the second version of the SERP may be a first version of the SERP including a modification (i.e., a modified first version of the SERP). For example, the modification may be applied on a user interface of the SERP, on a ranking algorithm of the SERP, location of elements on the SERP and the like or any combination thereof. In other embodiments, the second version of the SERP may have, compared to the first version of the SERP, a modified design of the advertisements, a modified background color, modified snippets, a modified presentation of advertisements in a special location on the SERP or any combination thereof. In yet another embodiment, the first version of the SERP may be a current production version of the SERP implemented by the search engine software and the second version of the SERP may be an update of the current production version of the SERP. It should be noted that other modifications from those mentioned above may be contemplated by the present technology.

Further, upon the receipt of the data packet 124 and the data packet 126 by the first electronic device 104 and the second electronic device 110, respectively, the browser 106 may display the first version of the SERP contained within the data packet 124 to the first set of users 102 and the browser 112 may display the second version of the SERP contained within the data packet 126 to the second set of users 108. Upon the display of the first version of the SERP, the first set of users 102 may decide to perform user interactions with the first version of the SERP. Similarly, upon the display of the second version of the SERP, the second set of users 108 may decide to perform the user interactions with the second version of the SERP.

Generally, the first set of users 106 and the second set of users 108 may "interact" with the SERP in many ways. In some instances, the many ways in which the first set of users 106 and the second set of users 108 interact with the SERP may be by selecting a particular search result or a link, by submitting a query reformulation or a distinct query, by spending an amount of time on the SERP or on the particular search result and the like. Therefore, in some embodiments of the present technology, a type of user interaction may be clicks on the SERP, transitions to other web pages from the SERP, submitted queries, time spent on the SERP or on the other web pages, user SERP sessions and the like. Information related to the user interactions may be stored in a browser cache (not depicted) of the browser 106 and/or the browser 112. It should be noted that the first set of users 106 and the second set of users 108 may interact with the SERP in other ways from the many ways mentioned above. The many ways of interacting with the SERP were presented for ease of explanation only and, therefore, other user interactions and other types of user interaction may be contemplated in some implementations of the present technology.

In another embodiment of the present technology, a data packet 128 may be sent by the first electronic device 104 to the server 116. The data packet 128 comprises the information related to the user interactions of the first set of users 102 with the first version of the SERP. Similarly, a data packet 130 may be sent by the second electronic device 110 to the server 116. The data packet 130 comprises the information related to the user interactions of the second set of users 108 with the second version of the SERP.

In some embodiments, the data packet 128 may comprise a fifth plurality of data packets, each data packet of the fifth plurality of data packets being sent from the respective electronic device of the first plurality of electronic devices. Similarly, the data packet 130 may comprise a sixth plurality of data packets, each data packet of the sixth plurality of data packets being sent from the respective electronic device of the second plurality of electronic devices.

In other embodiments, the server 116 may be configured to store the information related to the user interactions of the first set of users 102 with the first version of the SERP and the information related to the user interactions of the second set of users 108 with the second version of the SERP.

In alternative embodiments, the server 116 may filter the information related to the user interactions to obtain information related to a pre-selected type of user interaction. In one embodiment, the pre-selected type of user interaction may be pre-selected by a human assessor. In another embodiment, the pre-selected type of user interaction may be pre-selected by the server 116 based on the modification applied to the second version of the SERP compared to the first version of the SERP. For example, if the modification is applied on the ranking algorithm of search results, the server 116 may filter the information related to the user interactions to obtain information related to the time spent on search results having been selected. Usually, the pre-selected type of user interaction is pre-selected based on how well the pre-selected type of user interaction may reflect a change in user behavior between the first and the second version of the SERP.

In yet further embodiments, the server 116 may be configured to send another instruction (not depicted) to the first electronic device 104 and to the second electronic device 112 for including into the data packets 128 and 130 the information related to the user interactions being only of a pre-selected type of user interaction, respectively.

In some embodiments, the server 116 may then be configured to assess first measures of user interactions being of the pre-selected type of user interaction with the first version of the SERP and second measures of user interaction being of the pre-selected type of user interaction with the second version of the SERP. As mentioned above, the first and the second measures of user interactions may be any kind of measures relating to the interaction between any user within the first and the second sets of users 102 and 108 and the SERP (e.g., an amount of time spent on a given search results, an amount of time spent between consecutive sessions on the SERP, a number of clicks on the SERP, a number of queries submitted, a number of query reformulations, etc.). In another embodiment, assessing the first measures of user interactions and the second measures of user interactions may comprise grouping the information related to the user interactions being of the pre-selected type of user interaction. For the purpose of understanding, FIG. 2 depicts a table 200 and a table 202 illustrating the first and the second measures of user interactions being of the pre-selected type of user interaction.

The table 200 encompasses the first measures of user interactions with the first version of the SERP after the first measures of user interactions have been assessed by the server 116. Needless to say, the first measures of user interactions with the first version of the SERP relate to the user interactions being of the pre-selected type of user interaction performed by each user within the first set of users 102 (i.e., User A, B, C, D, E as depicted in FIG. 2). A column 204 comprises the first measures of user interactions (in this case the pre-selected type of user interaction is the number of sessions) respectively corresponding to each user within the first set of users 102. For instance, the server 116 assessed the measure of 4 sessions for the user C.

The table 202 encompasses the second measures of user interactions with the second version of the SERP after the second measures of user interactions have been assessed by the server 116. Needless to say, the second measures of user interactions with the second version of the SERP relate to the user interactions being of the pre-selected type of user interaction performed by each user within the second set of users 108 (i.e., User F, G, H, I, J as depicted in FIG. 2). A column 204 comprises the second measures of user interactions respectively corresponding to each user within the second set of users 108. For instance, the server 116 assessed the measure of 6 sessions for the user J.

It should be noted that the number of users having been illustrated in FIG. 2 for the first and the second sets of users 102 and 108 was depicted for ease of explanation only, and should not be considered as a limiting aspect of the present technology. Moreover, the columns 204 and 206 may comprise multiple measures respectively corresponding to each user within the first and the second sets of users 102 and 108. For example, if the pre-selected type of user interaction is click dwell-time, the columns 204 and 206 may comprise multiple measures of the click dwell-time for each user depending on how many clicks each user performed.

In some embodiments, the server 116 may be configured to store the table 200 encompassing the first measures of user interactions and the table 202 encompassing the second measures of user interactions after the first and the second measures of user interactions have been assessed by the server 116. For example, the server 116 may store the table 200 and the table 202 in the storage 118. In alternative embodiments, the table 200 and 202 may be processed by the processor of the server 116 for preforming additional functionalities thereof. For example, the table 200 and 202 may be processed by the processor for computing a first and a second distribution of the first and the second measures of user interactions, respectively, as it will be described below.

In another embodiment, the server 116 may further be configured to compute the first distribution of the first measures of user interactions and the second distribution of the second measures of user interactions. In statistics, calculating "a distribution" of values in a sample refers to calculating a frequency of each value in the sample. Let's say that three users within the first set of users 102 have performed 5 sessions. In this case, the frequency of the first measure being equal to 5 sessions is three divided by the number of users in the first set of users 102 since only three users amongst the number of users in the first set of users 102 have performed 5 sessions. Therefore, the server 116 may calculate the frequency of each of the first measures of user interactions to compute the first distribution of the first measures of user interactions. Similarly, the server 116 may calculate the frequency of each of the second measures of user interactions to compute the second distribution of the second measures of user interactions.

In an alternative embodiment, computing the first and the second distribution may comprise discretizing the first measures and the second measures of user interactions into bins of measures of user interactions. In other words, the first measures and the second measures of user interactions may be split/discretized into the bins of measures of user interactions wherein bins of the first measures of user interactions may have identical intervals as bins of the second measures of user interactions. Hence, the server 116 may be configured to compute the first and the second distribution of the bins of measures of user interactions.

Developers of the present technology have appreciated that a disadvantage, one amongst many, of the state-of-the-art criteria for detecting if the change in user interactivity has occurred between the first version of the SERP and the second version of the SERP is that a change in mean values of the first and the second measures of user interactions may not be noticeable or statistically significant. In accordance with embodiments of the present technology, on the other hand, the server 116 may analyze the first and the second distributions conjointly for determining a magnitude of the change in user interactivity. In other words, the server 116 may analyze the first and the second distribution as a whole to determine a relative distribution change between them.

In some embodiments, a relative change between the first and the second distribution may be indicative of the change in user interactivity between the first and the second version of the SERP. It should be noted that when a given user performs a given user interaction, the given user interaction may be considered as successful or unsuccessful to the given user. In some embodiments, on the basis that each measure of user interaction being of the pre-selected type of user interaction may be considered as a success or a failure for each user with respect to her objective on the SERP, the first distribution may be decomposed into a first weighted sum of a pair of distributions (i.e., a distribution of successful user interactions and a distribution of unsuccessful user interactions). Similarly, the second distribution may be decomposed into a second weighted sum of the pair of distributions. Equations (1) and (2) denote the first and the second weighted sum of the pair of distributions, respectively:

$$D_a(x) = p_A F_1(x) + (1-p_A) F_0(x) \qquad (1)$$

$$D_b(x) = p_B F_1(x) + (1-p_B) F_0(x) \qquad (2)$$

where x corresponds to the measure of user interaction, $D_a$ and $D_b$ respectively correspond to the first distribution and the second distribution, $F_0$ and $F_1$ correspond to the pair of distributions, $p_A$ and $p_B$ respectively correspond to a first and a second weight factor which may be between 0 and 1.

Therefore, a magnitude of change $\propto$ between the first and the second distribution may be attributed to a difference between the first weight factor $p_A$ and the second weight factor $p_B$:

$$D_b(x) - D_a(x) = \propto [F_1(x) - F_0(x)] \quad (3)$$

$$\propto = p_B - p_A \quad (4)$$

It should be noted that by using equations (1) (2) and (4), $F_0$ and $F_1$ may be expressed in terms of $\propto$, $p_A$, $p_B$, $D_a$ and $D_b$:

$$F_1(x) = \frac{1}{\propto}[(1 - p_A)D_b(x) - (1 - p_B)D_a(x)] \quad (5)$$

$$F_0(x) = \frac{1}{\propto}[p_B D_a(x) - p_a D_b(x)] \quad (6)$$

$$F_i(x) \geq 0, \int_X F_i(x)\,dx = 1, \forall\, x \in X \quad (7)$$

Figure 3:
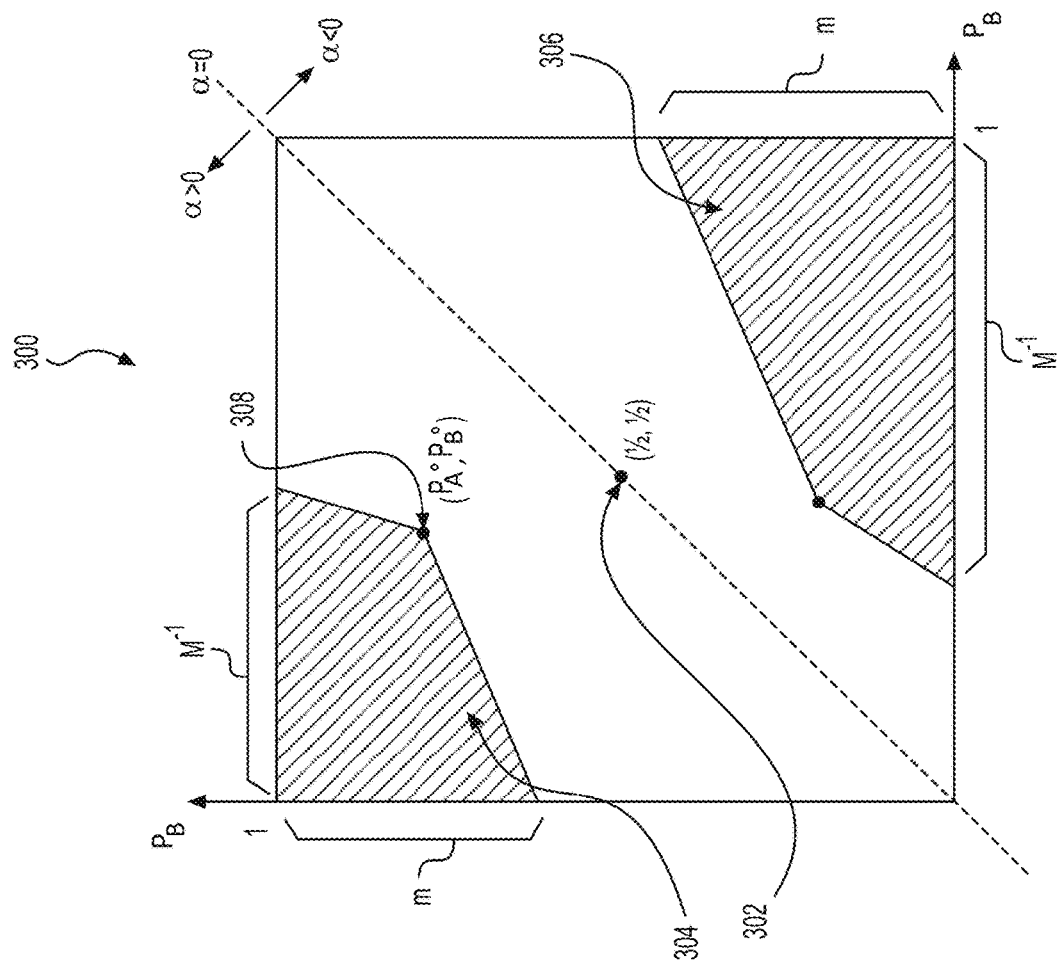
FIG. 3 is an example of a solution set for weight factors having been processed by a server in an implementation of the present technology.

According to equations (5), (6) and (7), $F_0$ and $F_1$ may be computed for each possible pair ($p_A$, $p_B$). A solution set 300 of all possible pairs ($p_A$, $p_B$) that may satisfy the equations (5), (6) and (7) is depicted in FIG. 3. It should be noted that the solution set 300 is centro-symmetrical with respect to a point 302 being (0.5,0.5). A first region 304 and a second region 306 within the solution set 300 encompass the all possible pairs ($p_A$, $p_B$) that may satisfy the equations (5), (6) and (7).

In some embodiments, the first region 304 and the second region 306 may be defined with respect to a lowest ratio m and a highest ratio M as depicted in FIG. 3. The lowest ratio m and the highest ratio M may be:

$$m = \inf x \in X \frac{D_b(x)}{D_a(x)} \in [0, 1) \quad (8)$$

$$M = \sup x \in X \frac{D_b(x)}{D_a(x)} \in (1, +\infty] \quad (9)$$

In other words, the lowest ratio m is the lowest ratio between a value of the first distribution and a corresponding value of the second distribution for any measure of user interaction being within the first and the second measures of user interactions. Similarly, the highest ratio M is the highest ratio between the value of the first distribution and the corresponding value of the second distribution for the any measure of user interaction being within the first and the second measures of user interactions. In some embodiments, the lowest ratio may be indicative of a smallest relative change between the first and the second distributions and the highest ratio may be indicative of a largest relative change between the first and the second distributions.

In additional embodiments of the present technology, the server 116 may select an optimal pair 308 being ($p_A^0$, $p_B^0$) from the solution set 300 as a possible pair ($p_A$, $p_B$) which minimizes an absolute value of the magnitude $\propto$ between the first and the second distribution. By way of explanation, if a minimum absolute value of the magnitude $\propto$ is different from 0, the change in user interactivity has occurred between the first and the second version of the SERP. In other embodiments, the minimum absolute value of the magnitude $\propto$ may be the magnitude of the change in user interactivity. The optimal pair 308 from the solution set 300 may be expressed in terms of M and m:

$$p_B^0 = \frac{M(1-m)}{M-m} \quad (10)$$

-continued $$p_A^0 = \frac{1-m}{M-m} \quad (11)$$

and therefore, $$\min|\alpha| = |p_B^0 - p_A^0| = \alpha^0 = \frac{(M-1)(1-m)}{M-m} \quad (12)$$

In additional embodiments, the solution set 300 may be processed by the processor of the server 116 for selecting the optimal pair 308. In other words, the server 116 may be configured to process the solution set 300 for selecting the possible pair ($p_A$,$p_B$) which minimizes the absolute value of the magnitude $\propto$ between the first and the second distribution.

In some embodiments, the server 116 may determine a statistical significance of the magnitude of the change in user interactivity. The statistical significance may be determined via a statistical test which evaluates whether the first and the second distribution differ from one another. Generally, as a person skilled in the art will understand, the statistical test accepts or rejects a null hypothesis, which assumes that the observed difference between the first and the second distribution is caused by random fluctuations. A large variety of statistical tests may be used for determining the statistical significance of the magnitude of the change in user interactivity.

In one embodiment, a bootstrapping technique combined with a one sample t-test may be used to evaluate the null hypothesis of the magnitude of the change in user interactivity being different from 0. The bootstrapping technique begins by obtaining bootstrap samples of the first and the second measures of user interactions from the first and the second measures of user interactions, respectively. Then, based on the bootstrap samples of the first and the second measures of user interactions the server 116 may be configured to compute a first empirical and a second empirical distribution. The server 116 may be configured to determine a first value of $\alpha^0$ with respect to the first and the second empirical distributions. Further, another bootstrap sample of the first measures of user interactions may be obtained. The server 116 may then calculate another second empirical distribution using the another bootstrap sample of the first measures of user interactions. In other words, the statistical test compares the bootstrap sample of the first measures of user interactions with the another bootstrap sample of the first measures of user interactions. A second value of $\alpha^0$ may then be determined with respect to the first empirical distribution and the another second empirical distribution. A difference between the first value and the second value of $\alpha^0$ may then be computed. The server 116 may execute the bootstrapping technique multiple times to obtain a set of differences between the first values and the second values of $\alpha^0$. Then a one sample t-test may be applied on the set of differences between the first values and the second values of $\alpha^0$.

Figure 4:
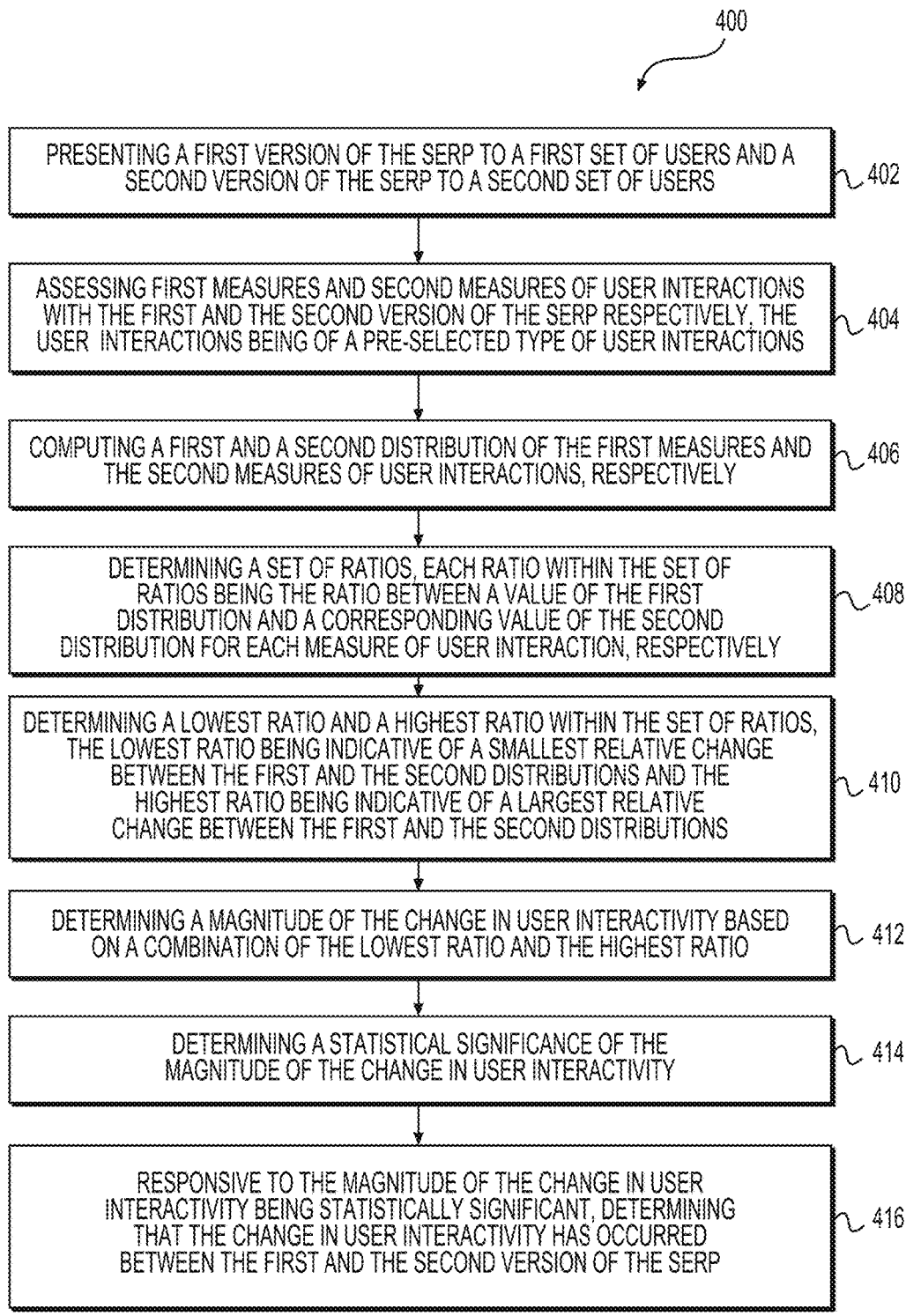
FIG. 4 illustrates a block diagram of a method of detecting a change in user interactivity between a first and a second version of a SERP.

In other embodiments of the present technology, the server 116 may be configured to execute a method 400 depicted in FIG. 4 of detecting if the change in user interactivity has occurred between a first and a second version of a SERP. The method 400 will now be described.

STEP 402: Presenting a First and a Second Version of the SERP

The method 400 begins at step 402 with the server 116 presenting the first version of the SERP to the first set of users 102 and the second version of the SERP to a second set of users 108.

In some embodiments, the search engine software of the server 116 may generate and send the data packet 124 to the first electronic device 104 and the data packet 126 to the second electronic device 110. The data packet 124 may comprise the first version of the SERP and the instructions for the browser 106 to display the first version of the SERP on the display of the first electronic device 104. In other words, the data packet 124 may comprise the first version of the SERP and instructions for the presentation thereof to the first set of users 102. Similarly, the data packet 126 may comprise the second version of the SERP and the instructions for the browser 112 to display the second version of the SERP on the display of the second electronic device 110. In other words, the data packet 126 may comprise the second version of the SERP and instructions for the presentation thereof to the second set of users 108.

STEP 404: Assessing First Measures and Second Measures of User Interactions with the First and the Second Version of the SERP, Respectively The method 400 continues to step 404 by assessing first measures and second measures of user interactions with the first and the second version of the SERP respectively, the user interactions being of the pre-selected type of user interactions.

In another embodiment, the data packet 128 may be sent by the first electronic device 104 to the server 116 comprising the information related to the user interactions of the first set of users 102 with the first version of the SERP. Similarly, the data packet 130 may be sent by the second electronic device 110 to the server 116 comprising the information related to the user interactions of the second set of users 108 with the second version of the SERP.

In some embodiments, the server 116 may filter the information related to the user interactions of the first set of users 102 and the second set of users 108 to obtain the information related to the pre-selected type of user interaction. In one embodiment, the pre-selected type of user interaction may be pre-selected by the human assessor. In another embodiment, the pre-selected type of user interaction may be pre-selected by the server 116 based on the modification applied to the second version of the SERP compared to the first version of the SERP.

In another embodiment, assessing the first measures of user interactions and the second measures of user interactions may comprise grouping the information related to the user interactions being of the pre-selected type of user interaction of the first set of user 102 into the table 200 depicted in FIG. 2 and the information related to the user interactions being of the pre-selected type of user interaction of the second set of user 108 into the table 202.

STEP 406: Computing a First and a Second Distribution of the First Measures and the Second Measures of User Interactions, Respectively The method 400 continues to step 406 by computing the first and the second distribution of the first measures and the second measures of user interactions, respectively.

In an alternative embodiment, computing the first and the second distribution may comprise discretizing the first measures and the second measures of user interactions into the bins of measures of user interactions. The bins of the first measures of user interactions may have the identical intervals as the bins of the second measures of user interactions. Hence, the server 116 may be configured to compute the first and the second distribution of the bins of measures of user interactions.

Further, the server 116 may be configured to analyze the first and the second distribution conjointly for determining the magnitude of the change in user interactivity. The analyzing comprises steps 408, 410, 412 and 414 of the method 400.

STEP 408: Determining a Set of Ratios

The method 400 continues to step 408 by determining a set of ratios, each ratio within the set of ratios being the ratio between the value of the first distribution and the corresponding value of the second distribution for each measure of user interaction, respectively. For example, one ratio being within the set of ratios may be the ratio between the value of the first distribution and the corresponding value of the second distribution for one measure of user interaction being within the first and the second measures of user interactions.

In another embodiment, the computing the first and the second distributions comprises discretizing the first measures and the second measures of user interactions into the bins of measures of user interactions. The server 116 may determine the set of ratios, wherein each ratio is the ratio between the value of the first distribution and the corresponding value of the second distribution for each bin of measures of user interactions, respectively.

STEP 410: Determining the Lowest Ratio and the Highest Ratio within the Set of Ratios The method 400 continues to step 410 by determining the lowest ratio and the highest ratio within the set of ratios, the lowest ratio being indicative of the smallest relative change between the first and the second distributions and the highest ratio being indicative of the largest relative change between the first and the second distributions.

In some embodiments of the present technology, the determination of the lowest and the highest ratio is executed by verifying which ratios within the set of ratios may validate the equations (8) and (9), respectively.

STEP 412: Determining the Magnitude of the Change in User Interactivity

The method 400 continues to step 412 by determining the magnitude of the change in user interactivity based on a combination of the lowest ratio and the highest ratio. In some embodiments, the combination of the lowest ratio and the highest ratio may be defined by the equation (12) wherein M is the highest ratio within the set of ratios and m is the lowest ratio within the set of ratios.

STEP 414: Determining the Statistical Significance of the Magnitude of the Change in User Interactivity The method 400 continues to step 414 by determining a statistical significance of the magnitude of the change in user interactivity. It should be noted that different statistical tests may be used for determining the statistical significance of the magnitude of the change in user interactivity.

However, in some embodiments, the statistical significance may be determined via a combination of the bootstrapping technique with the one sample t-test. The combination of the bootstrapping technique with the one sample t-test may be used to evaluate the null hypothesis of the magnitude of the change in user interactivity being different from 0.

STEP 414: Determining Whether the Change in User Interactivity has or has Not Occurred Between the First and the Second Version of the SERP The method 400 may end at step 416 where responsive to the magnitude of the change in user interactivity being statistically significant, the server 116 may determine that the change in user interactivity has occurred between the first and the second version of the SERP.

In an alternative embodiment, analyzing the first and the second distribution conjointly may further comprise computing the pair of distributions at least partially based on the highest and the lowest ratios. The computing the pair of distributions may comprise decomposing the first and the second distribution into the first and the second weighted sum of the pair of distributions respectively as expressed by the equations (1) and (2).

In other embodiments, the computing the pair of distributions may be executed via the equations (5) and (6) which are at least partially based on the highest and the lowest ratios. In fact, the first and the second weight factors used in the equations (5) and (6) may be calculated via the equations (10) and (11). Moreover, the magnitude of the change used in the equations (5) may be the magnitude of the change in user interactivity determined in the step 412.

In an additional embodiment, analyzing the first and the second distribution conjointly may further comprise determining whether the detected change in user interactivity is positive or negative based on the pair of distributions.

In some embodiments, determining whether the detected change in user interactivity (i.e., the magnitude of the change in user interactivity being statistically significant) is positive or negative based on the pair of distributions may comprise analyzing the pair of distributions. It should be noted that various analyses of the pair of distributions are contemplated by the present technology for determining whether the detected change in user interactivity is positive or negative.

Figure 5:
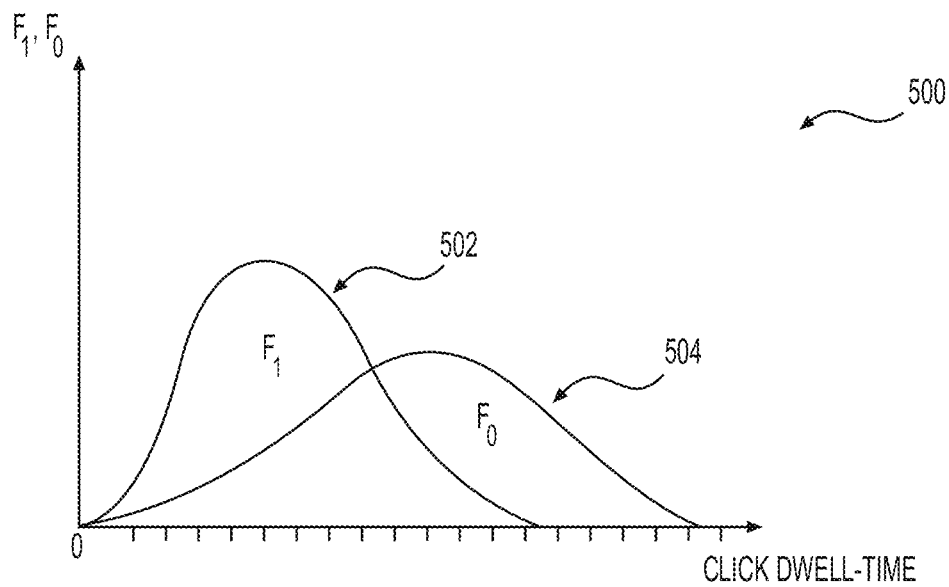
FIG. 5 illustrates a first and a second scenario for determining whether the detected change in user interactivity is positive or negative.
Figure 5:
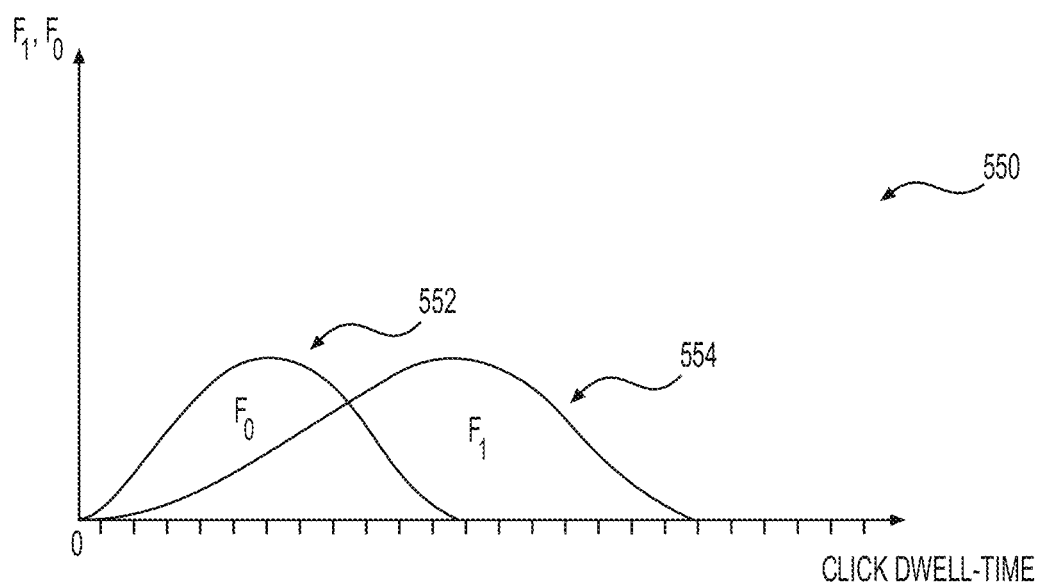

For example, in one embodiment, the analysis of the pair of distributions may be comparing respective mean values of each distribution within the pair of distributions with reference to the pre-selected type of user interactions. With reference to FIG. 5, a first scenario 500 and a second scenario 550 are illustrated with reference to the pre-selected type of user interactions being click dwell-time. In some embodiments, the server 116 may be configured to compute the pair of distributions at least partially based on the highest and the lowest ratios. In other words, the computing the pair of distributions by the server 116 may comprise applying the equations (5) and (6). It should be noted that the equations (5) and (6) are at least partially based on the highest and the lowest ratios and were obtained following the decomposition of the first and the second distribution into the first and the second weighted sum of the pair of distributions, respectively.

Let's say that the computing the pair of distributions by the server 116 via the equations (5) and (6) results in the pair of distributions 502 and 504 of the first scenario 500. Moreover, based on the equations (12), (1) and (2), the magnitude of the change in user interactivity corresponds to a contribution increase of $F_1$ in the second weighted sum of the pair of distributions compared to the first weighted sum of the pair of distributions. It should be noted that higher measures of the click dwell-time are considered to be "good" as a person skilled in the art will understand. The server 116 may compute the respective mean values of each distribution within the pair of distributions 502 and 504. In this case, a mean value of $F_1$ is inferior to a mean value of $F_0$. Therefore, with reference to the pre-selected type of user interactions, $F_1$ may be considered as the unsuccessful distribution of user interactions since the mean value of $F_1$ corresponds to a lower measure of the click dwell-time than the mean value of $F_0$. Consequently, since the magnitude of the change in user interactivity corresponds to the contribution increase of $F_1$ in the second weighted sum of the pair of distributions compared to the first weighted sum of the pair of distributions, the server 116 may determine that the detected change in user interactivity was negative.

Now let's say that the computing the pair of distributions by the server 116 via the equations (5) and (6) results in the pair of distributions 552 and 554 of the second scenario 550. As mentioned above, based on the equations (12), (1) and (2), the magnitude of the change in user interactivity corresponds to the contribution increase of $F_1$ in the second weighted sum of the pair of distributions compared to the first weighted sum of the pair of distributions. The server 116 may compute the respective mean values of each distribution within the pair of distributions 552 and 554. In this case, the mean value of $F_1$ is superior to the mean value of $F_0$. Therefore, with reference to the pre-selected type of user interactions, $F_1$ may be considered as the successful distribution of user interactions since the mean value of $F_1$ corresponds to a higher measure of the click dwell-time than the mean value of $F_0$. Consequently, since the magnitude of the change in user interactivity corresponds to the contribution increase of $F_1$ in the second weighted sum of the pair of distributions compared to the first weighted sum of the pair of distributions, the server 116 may determine that the detected change in user interactivity was positive.

Figure 6:
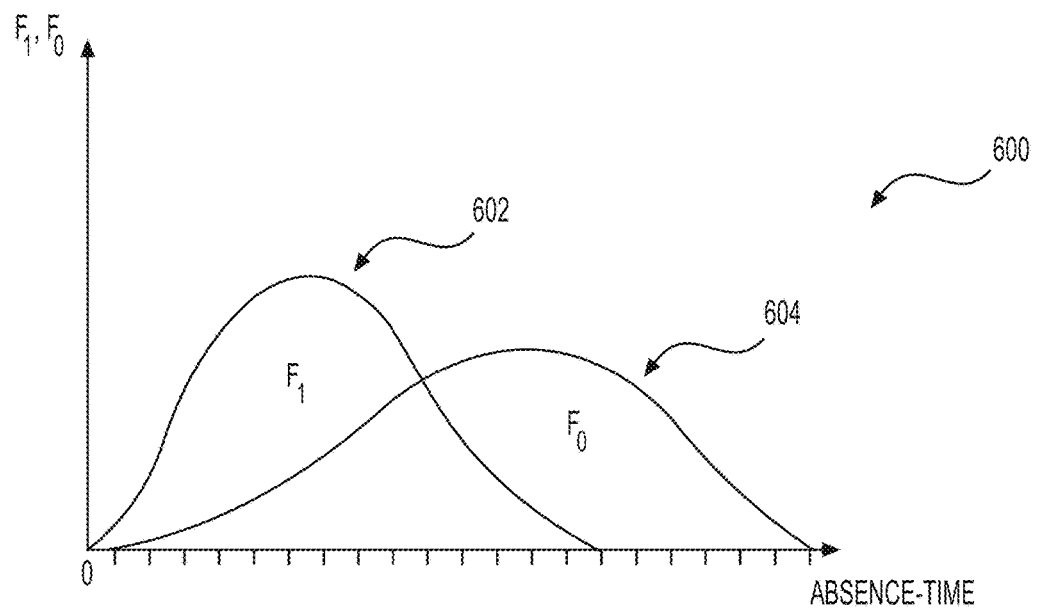
FIG. 6 illustrates a third and a fourth scenario for determining whether the detected change in user interactivity is positive or negative.
Figure 6:
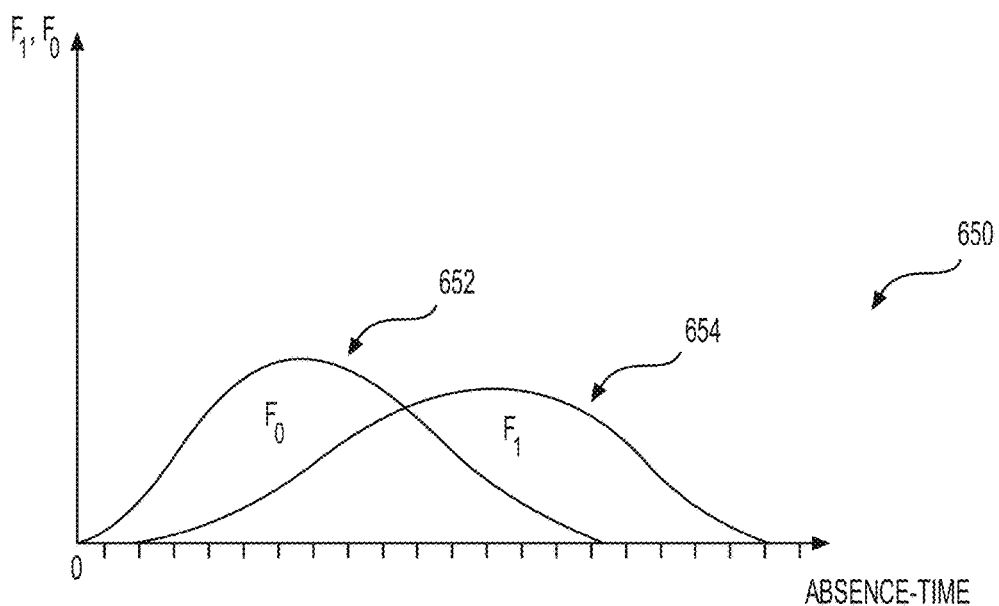

With reference to FIG. 6, a third scenario 600 and a fourth scenario 650 are illustrated with respect to the pre-selected type of user interactions being absence-time. Let's say that the computing the pair of distributions by the server 116 via the equations (5) and (6) results in a pair of distributions 602 and 604 of the third scenario 600. As mentioned above, based on the equations (12), (1) and (2), the magnitude of the change in user interactivity corresponds to the contribution increase of $F_1$ in the second weighted sum of the pair of distributions compared to the first weighted sum of the pair of distributions. It should be noted that higher measures of the absence-time are considered to be "bad" as the person skilled in the art will understand. The server 116 may compute the respective mean values of each distribution within the pair of distributions 602 and 604. In this case, a mean value of $F_1$ is inferior to a mean value of $F_0$. Therefore, with reference to the pre-selected type of user interactions, $F_1$ may be considered as the successful distribution of user interactions since the mean value of $F_1$ corresponds to a lower measure of the absence-time than the mean value of $F_0$. Consequently, since the magnitude of the change in user interactivity corresponds to the contribution increase of $F_1$ in the second weighted sum of the pair of distributions compared to the first weighted sum of the pair of distributions, the server 116 may determine that the detected change in user interactivity was positive.

Now let's say that the computing the pair of distributions by the server 116 via the equations (5) and (6) results in the pair of distributions 652 and 654 of the fourth scenario 650. As mentioned above, based on the equations (12), (1) and (2), the magnitude of the change in user interactivity corresponds to the contribution increase of $F_1$ in the second weighted sum of the pair of distributions compared to the first weighted sum of the pair of distributions. The server 116 may compute the respective mean values of each distribution within the pair of distributions 652 and 654. In this case, the mean value of $F_1$ is superior to the mean value of $F_0$. Therefore, with reference to the pre-selected type of user interactions, $F_1$ may be considered as the unsuccessful distribution of user interactions since the mean value of $F_1$ corresponds to a higher measure of the absence-time than the mean value of $F_0$. Consequently, since the magnitude of the change in user interactivity corresponds to the contribution increase of $F_1$ in the second weighted sum of the pair of distributions compared to the first weighted sum of the pair of distributions, the server 116 may determine that the detected change in user interactivity was negative.

A plurality of experiments have been conducted for comparing the state-of-the-art criterion and the method 400 of detecting if the change in user interactivity has occurred between the first version of the SERP and the second version of the SERP. Three experiments amongst the plurality of experiments will now be described and their results will be exhibited. Each one of the three experiments ran for two weeks and the first set of users 102 and the second set of users 108 were all uniformly randomly selected and were almost of the same size. The results of the three experiments were consistent with the plurality of experiments having been conducted.

A first experiment evaluates the modification of the design of the advertising, which is displayed together with organic search (algorithmic) results on the SERP. In the first version of the SERP, the advertising results were marked out as a special SERP region by a slightly different background color. In the second version of the SERP, each ad snippet was marked separately and the background was the same as for the rest of the SERP. A second experiment evaluates a deterioration of the organic search algorithm by ignoring commercial quality labels on the second version of the SERP. A third experiment evaluates a deterioration of the organic algorithm by swapping the search results on the second version of the SERP.

For each of the three experiments, the pre-selected type of user interaction is click dwell-time and the measures of user interactions are the amount of time each user spent on each selected search result. Moreover, the measures of user interactions being of the pre-selected type of user interactions have been sorted into three different sets of user interactions. A first set of measures of user interactions relates to click dwell-times of clicks on advertising results only (ADV). A second set of measures of user interactions relates to click dwell-times of clicks on organic search results only (ORG). A third set of measures of user interactions relates to click dwell-times of clicks on all search results (ALL).

The statistical significance of results of the three experiments was determined with two different statistical tests: Kolmogorov-Smirnov test (KS) and the combination of the bootstrapping technique with the one sample t-test (Boot). A level of statistical significance was set to 5% as the person skilled in the art will understand. The results are summarized in table (1).

With reference to the results of the first experiment in table (1), it should be noted that the state-of-the-art criterion (i.e., Mean Dwell-Time) detected a change for the advertising results (ADV) traffic and for the all search results (ALL) traffic. In other words, the dwell time of an average click on the advertising results and on all search results increased. Moreover, the dwell-time does not change for the organic search (ORG) traffic. Therefore, the state-of-the-art criterion determines that the first experiment is positive since the dwell time of the clicks on the advertising results increases without changing the dwell time of the clicks on the organic search results.

On the basis of the magnitude of the change in user interactivity which is contemplated by the present technology, a change in the advertising results traffic and in the all search results traffic has been detected as well. However, contrariwise to the state-of-the-art-criterion, the magnitude of the change in user interactivity was determined to be statistically significant (i.e., using the combination of the bootstrapping technique with the one sample t-test) for the organic search (ORG) traffic. Therefore, the method 400 depicted in FIG. 4 detected a significant small difference even in the organic search traffic.

A similar situation may be observed in the second and the third experiment. First, the method 400 using the combination of the bootstrapping technique with the one sample t-test for testing the statistical significance of the magnitude of the change in user interactivity detected changes for all sets of measures of user interactions for which the state-of-the-art criterion detected changes. Second, the method 400 using the combination of the bootstrapping technique with the one sample t-test detected changes for several sets of measures of user interactions for which the state-of-the-art criterion has not detected changes. Third, the method 400 using the combination of the bootstrapping technique with the one sample t-test has generally demonstrated lower p-values than the state-of-the-art criterion which indicates a higher sensitivity as the person skilled in the art will understand.

Therefore, the experiments conducted establish a potential technical result of some embodiment. More specifically, the method 400 using the combination of the bootstrapping technique with the one sample t-test outperformed the state-of-the-art criterion in the three experiments both in terms of sensitivity level (i.e., p-value) and in terms of a number of detected changes in user interactivity.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

TABLE 1

The results of the three experiments

| Exps | Click traffic | Mean-DT | | | | | ODD-DT | | | | | |
| --- | --- | --- | --- | --- | --- | --- | --- | --- | --- | --- | --- | --- |
| | | $avg_A$ | Δ | % Δ | SE | $p_{val}$ | $p_A^\theta$ | $\alpha_+^O$ | $\beta_+^O$ | SE | KS $p_{val}$ | Boot $p_{val}$ |
| Exp #1 | ADV | 667.4 | 11.0 | 0.0165 | 2.0 | <0.001 | 0.64 | 0.028 | 0.044 | 0.0012 | <0.001 | <0.001 |
| Advertising | ORG | 907.8 | −0.2 | −0.0002 | 1.2 | 0.03 | 0.43 | 0.0009 | 0.0021 | 0.0003 | >0.001 | 0.02 |
| design | ALL | 865.2 | 5.5 | 0.0064 | 1 | <0.001 | 0.77 | 0.006 | 0.0078 | 0.0005 | <0.001 | <0.001 |
| Exp #2 | ADV | 550.4 | 2.9 | 0.0063 | 5.7 | 9.6 | 0.49 | 0.003 | 0.006 | 0.002 | >0.08 | 0.17 |
| Commercial | ORG | 651.4 | −6.9 | −0.0106 | 2.7 | 0.01 | 0.8 | 0.01 | 0.08 | 0.0014 | <0.05 | <0.001 |
| quality | ALL | 631.5 | −5.9 | −0.0098 | 2.8 | 0.08 | 0.37 | 0.008 | 0.022 | 0.0011 | <0.05 | <0.001 |
| Exp #3 | ADV | 668.1 | 9.5 | 0.0007 | 3.2 | 8.9 | 0.48 | 0.0084 | 0.0079 | 0.0012 | >0.05 | 0.01 |
| Swap | ORG | 1122.0 | −18.9 | −0.0168 | 0.8 | <0.001 | 0.58 | 0.008 | 0.0014 | 0.0004 | <0.001 | <0.001 |
| | ALL | 1104.3 | −18.3 | −0.0168 | 0.7 | <0.001 | 0.58 | 0.0077 | 0.018 | 0.004 | <0.001 | <0.001 |

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

As such, from one perspective, embodiments of the present technology described above can be summarized as follows, structured in numbered clauses.

CLAUSE 1. A method of detecting if a change in user interactivity has occurred between a first and a second version of a SERP, the second version of the SERP being a modified version of the SERP, the method executable at a server (116), the method comprising:
  presenting (402) the first version of the SERP to a first set of users (102) and the second version of the SERP to a second set of users (108);
  assessing (404) first measures and second measures of user interactions with the first and the second version of the SERP respectively, the user interactions being of a pre-selected type of user interactions;
  computing (406) a first and a second distribution of the first measures and the second measures of user interactions, respectively;
  analyzing the first and the second distribution conjointly for determining a magnitude of the change in user interactivity, the analyzing comprises:
    determining (408) a set of ratios, each ratio within the set of ratios being the ratio between a value of the first distribution and a corresponding value of the second distribution for each measure of user interaction, respectively;
    determining (410) a lowest ratio and a highest ratio within the set of ratios, the lowest ratio being indicative of a smallest relative change between the first and the second distributions and the highest ratio being indicative of a largest relative change between the first and the second distributions;
    determining (412) the magnitude of the change in user interactivity based on a combination of the lowest ratio and the highest ratio; and
    determining (414) a statistical significance of the magnitude of the change in user interactivity;
  responsive to the magnitude of the change in user interactivity being statistically significant, determining (416) that the change in user interactivity has occurred between the first and the second version of the SERP.

CLAUSE 2. The method of clause 1, the analyzing further comprises:
  computing a pair of distributions (502, 504) at least partially based on the highest and the lowest ratios, the computing comprises decomposing the first and the second distribution into a first and a second weighted sum of the pair of distributions respectively; and
  determining whether the detected change in user interactivity is positive or negative based on the pair of distributions.

CLAUSE 3. The method of clause 1, wherein computing the first and the second distributions comprises discretizing the first measures and the second measures of user interactions into bins of measures of user interactions, the analyzing comprises:
  each ratio within the set of ratios being the ratio between the value of the first distribution and the corresponding value of the second distribution for each bin of measures of user interactions, respectively.

CLAUSE 4. The method of clause 1, the combination of the lowest ratio and the highest ratio being calculated using:

$$\alpha^0 = \frac{(M-1)(1-m)}{M-m}.$$

CLAUSE 5. The method of clause 1, wherein determining the statistical significance of the magnitude of the change in user interactivity comprises applying at least one of:
  a Kolmogorov-Smirnov test
  a combination of the bootstrapping technique with the one sample t-test CLAUSE 6. The method of clause 2, wherein determining whether the detected change in user interactivity is positive or negative based on the pair of distributions comprises comparing respective mean values of each distribution within the pair of distributions (502, 504) with reference to the pre-selected type of user interactions.

CLAUSE 7. The method of clause 3, wherein bins of the first measures of user interactions have identical intervals as bins of the second measures of user interactions.

CLAUSE 8. A server (116) comprising a processor and computer-readable instructions for detecting if a change in user interactivity has occurred between a first and a second version of a SERP, the second version of the SERP being a modified version of the SERP, the processor configured to execute the method of clauses 1 to 7.

What we claim is:

1. A method of detecting if a change in user interactivity has occurred between a first and a second version of a SERP, the second version of the SERP being a modified version of the SERP, the method executable at a server, the method comprising:
  presenting the first version of the SERP to a first set of users and the second version of the SERP to a second set of users;
  assessing first measures and second measures of user interactions with the first and the second version of the SERP respectively, the user interactions being of a pre-selected type of user interactions;
  computing a first and a second distribution of the first measures and the second measures of user interactions, respectively;
  analyzing the first and the second distribution conjointly for determining a magnitude of the change in user interactivity, the analyzing comprises:

determining a set of ratios, each ratio within the set of ratios being a ratio between a value of the first distribution and a corresponding value of the second distribution for each measure of user interaction, respectively;

determining a lowest ratio and a highest ratio within the set of ratios, the lowest ratio being indicative of a smallest relative change between the first and the second distributions and the highest ratio being indicative of a largest relative change between the first and the second distributions;

determining the magnitude of the change in user interactivity based on a combination of the lowest ratio and the highest ratio; and determining when the magnitude of the change in user interactivity is statistically significant;

responsive to the magnitude of the change in user interactivity being statistically significant, determining that the change in user interactivity has occurred between the first and the second version of the SERP; and based at least partially on the change in user interactivity and the pre-selected type of user interactions, determining if the second version of the SERP should be used instead of the first version of the SERP as a current production version of the SERP.

2. The method of claim 1, the analyzing further comprises:

computing a pair of distributions at least partially based on the highest ratio and the lowest ratio, the computing comprises decomposing the first and the second distribution into a first and a second weighted sum of the pair of distributions respectively; and determining whether the change in user interactivity is positive or negative based on the pair of distributions.

3. The method of claim 2, wherein determining whether the change in user interactivity is positive or negative based on the pair of distributions comprises comparing respective mean values of each distribution within the pair of distributions with reference to the pre-selected type of user interactions.

4. The method of claim 1, wherein computing the first and the second distributions comprises discretizing the first measures and the second measures of user interactions into bins of measures of user interactions, the analyzing comprises:

each ratio within the set of ratios being the ratio between the value of the first distribution and the corresponding value of the second distribution for each bin of measures of user interactions, respectively.

5. The method of claim 4, wherein bins of the first measures of user interactions have identical intervals as bins of the second measures of user interactions.

6. The method of claim 1, the combination of the lowest ratio and the highest ratio being calculated using:

$$\alpha^0 = \frac{(M-1)(1-m)}{M-m}.$$

7. The method of claim 1, wherein the determining when the magnitude of the change in user interactivity is statistically significant comprises applying at least one of:

a Kolmogorov-Smirnov test; and a combination of a bootstrapping technique with a one sample t-test.

8. A server comprising a processor and computer-readable instructions for detecting if a change in user interactivity has occurred between a first and a second version of a SERP, the second version of the SERP being a modified version of the SERP, the processor configured to:

present the first version of the SERP to a first set of users and the second version of the SERP to a second set of users;

assess first measures and second measures of user interactions with the first and the second version of the SERP respectively, the user interactions being of a pre-selected type of user interactions;

compute a first and a second distribution of the first measures and the second measures of user interactions, respectively;

analyze the first and the second distribution conjointly for determining a magnitude of the change in user interactivity, to analyze comprises:

determining a set of ratios, each ratio within the set of ratios being a ratio between a value of the first distribution and a corresponding value of the second distribution for each measure of user interaction, respectively;

determining a lowest ratio and a highest ratio within the set of ratios, the lowest ratio being indicative of a smallest relative change between the first and the second distributions and the highest ratio being indicative of a largest relative change between the first and the second distributions;

determining the magnitude of the change in user interactivity based on a combination of the lowest ratio and the highest ratio; and determining when the magnitude of the change in user interactivity is statistically significant;

responsive to the magnitude of the change in user interactivity being statistically significant, determine that the change in user interactivity has occurred between the first and the second version of the SERP; and based at least partially on the change in user interactivity and the pre-selected type of user interactions, determine if the second version of the SERP should be used instead of the first version of the SERP as a current production version of the SERP.

9. The server of claim 8, to analyze further comprises:

computing a pair of distributions at least partially based on the highest ratio and the lowest ratio, the computing the pair of distributions at least partially based on the highest and the lowest ratios comprises decomposing the first and the second distribution into a first and a second weighted sum of the pair of distributions respectively; and determining whether the change in user interactivity is positive or negative based on the pair of distributions.

10. The server of claim 9, wherein determining whether the change in user interactivity is positive or negative based on the pair of distributions comprises comparing respective mean values of each distribution within the pair of distributions with reference to the pre-selected type of user interactions.

11. The server of claim 8, wherein to compute the first and the second distributions comprises discretizing the first measures and the second measures of user interactions into bins of measures of user interactions, to analyze comprises:

each ratio within the set of ratios being the ratio between the value of the first distribution and the corresponding value of the second distribution for each bin of measures of user interactions, respectively.

12. The server of claim 11, wherein bins of the first measures of user interactions have identical intervals as bins of the second measures of user interactions.

13. The server of claim 8, the combination of the lowest ratio and the highest ratio being calculated using:

$$\alpha^0 = \frac{(M-1)(1-m)}{M-m}.$$

14. The server of claim 8, wherein the determining when the magnitude of the change in user interactivity is statistically significant comprises applying at least one of:
  a Kolmogorov-Smirnov test; and
  a combination of a bootstrapping technique with a one sample t-test.

* * * * *